United States Patent [19]

Belmares-Sarabia et al.

[11] Patent Number: 4,750,050
[45] Date of Patent: Jun. 7, 1988

[54] EDITING SYSTEM AND METHOD

[75] Inventors: Armand Belmares-Sarabia, Catskill, N.Y.; Stanley J. Chayka, Parsippany, N.J.

[73] Assignee: Corporate Communications Consultants, Inc., Fairfield, N.J.

[21] Appl. No.: 807,815

[22] Filed: Dec. 11, 1985

[51] Int. Cl.⁴ .............................................. H04N 9/87
[52] U.S. Cl. ...................................... 358/311; 358/22
[58] Field of Search ................. 358/310, 311, 327, 22, 358/80, 28

[56] References Cited

U.S. PATENT DOCUMENTS

| | | | |
|---|---|---|---|
| 4,096,523 | 6/1978 | Belmares-Sarabia et al. | 358/80 |
| 4,258,385 | 3/1981 | Greenberg et al. | 358/22 |
| 4,328,515 | 5/1982 | Wellendorf | 358/80 |
| 4,533,938 | 8/1985 | Hurst | 358/28 |

Primary Examiner—Donald McElheny, Jr.
Attorney, Agent, or Firm—Curtis, Morris & Safford

[57] ABSTRACT

An editing system and method for editing, which may include two or more video signal sources, a storage and retrieval device, color correction circuits, and equipment for combining video signals. Two or more sets of color correction values may be stored in the storage and retrieval device. The sets of color correction values are retrieved from the storage and retrieval device and applied to the color correction circuits which then respond to the sets of color correction values in order to color correct the video signals produced by the video signal sources. The equipment for combining video signals combines the color corrected video signals to produce edited video signals, which may be recorded with a video recorder. In this fashion, a color corrected edited master is made. Such an editing system advantageously includes a control mechanism that automatically controls the various components of the system in response to a predetermined set of instructions. Furthermore, the control mechanism may permit one or more of the components of the system to be selectively controlled by an operator. One set of color correction values may contain a color balance correction, a hue correction, a sauration correction, and a luminance correction. Other corrections may be included, too. The same set of color correction values may be employed for every scene, or different sets of color correction values may be used for different scenes.

45 Claims, 6 Drawing Sheets

EDITING SYSTEM AND METHOD

BACKGROUND OF THE INVENTION

The present invention relates to systems and methods for editing the contents of video tapes or motion picture films to produce an edited master. More particularly, the present invention pertains to improved color correction in such editing systems and methods.

Normally, a television program or a commercial is the result of an editing process. The editing process typically includes selecting and combining segments from several different videotapes or motion picture films to produce a single edited videotape, which is termed the "edited master" which can be used in broadcasting the program.

Conventional editing systems generally have one or more (e.g. four) video players or telecines or both, which function as video signal sources. Such systems typically contain a video switcher and a video recorder to record the edited master. These components are usually controlled by a computer.

Conventional editing systems may broadly be categorized as either "on-line" systems or "off-line" systems. Present on-line systems and off-line systems are usually computerized. Both types of systems may be used to produce an edited master. The "on line" systems usually produce broadcast quality edited masters, whereas the "off-line" systems usually use much less expensive equipment but do not produce broadcast quality masters. Because the off-line system is so much less expensive to buy and operate, often it is used instead of the more expensive system for an initial editing run in which the off-line system produces a so-called "decisions list" or "editing list", which is stored in a storage medium such as a floppy disk. The editing list contains information indicating the locations the first frame and the last frame of each of the segments used to make the edited master. The decisions list contains the same information, as well as information for implementing dissolves, wipes, keys, and other special effects. The different switching points for the various components of the editing system may be defined in hours, minutes, seconds, and/or frames, in accordance with a time code specified by the Society of Motion Picture and Television Engineers ("SMPTE").

Editing systems such as the foregoing create the basic problem of how to produce color-corrected video recordings of good quality at a reasonable cost from multiple signal sources.

Some prior editing systems have a separate color balance corrector connected to each of the video signal sources. Such systems, however, do not provide the best in color corrections, and are unsatisfactory for many editing jobs. In addition, the color balance correctors must be manually readjusted to change the color correction values. This manual readjustment of the color balance correctors may require a substantial amount of the operator's time, which increases the cost of the editing process.

Far better color correction can be provided by using with each source a more sophisticated color corrector such as that described in one or more of U.S. Pat. Nos. 4,096,523 (the "Rainbow" patent); 4,223,343 (the "Anamorphic" patent); 4,410,908 (the "Luminance" patent); copending, commonly owned U.S. patent applications Ser. No. 598,468, entitled "Color Correction System and Method with Localized Color Sampling", which is now U.S. Pat. No. 4,679,067 and Ser. No. 722,801, entitled "Improved Color Correction System and Method". With Scene-Change Detection", which is now U.S. Pat. No. 4,694,329. The disclosures of these patents and patent applications are hereby incorporated herein by reference. However, the cost of using several such devices in one editing system inhibits their use.

Another problem to be addressed by this invention is that conventional editing systems do not provide satisfactory color corrections for the edited master for some special effects, for example, some "dissolves", "wipes", and "keys".

As a result of the foregoing problems, the colors in edited master tapes either have been less than satisfactory, or the tapes have been color corrected using a single more sophisticated color corrector before or after the editing process. However, the latter results in an additional recording of the video signals and a small but undesirable degradation of signal quality, and requires additional time and materials.

OBJECTS OF THE INVENTION

Accordingly, an object of the present invention is to provide a means and method for producing color-corrected video recordings of good quality at a reasonable cost from multiple signal sources. It also is an object to provide an editing system and method which solve or alleviate the foregoing problems; a system and method, whether using a single source or multiple sources, which provide improved color correction capabilities at a relatively modest cost. It is a further object to provide such a method and system which avoid the signal degradation and time and materials costs of prior art systems. Another object of the present invention is to provide an editing system and method which can satisfactorily color correct an entire video picture when a special effect is used. A further object of the present invention is to decrease the time necessary for editing and color correcting the various segments of an edited master.

SUMMARY OF THE INVENTION

In accordance with the present invention, the foregoing objects are met by the provision of a system and method in which separate color correction values for either one or a plurality of video signal sources are stored in a computer memory. The appropriate values are retrieved from memory and used to correct the signals from the signal source when it is in operation. Relatively sophisticated, high quality color correction can be done and color corrected video recordings can be made without requiring a re-recording of the signals solely for color correction purposes, thus avoiding signal degradation and time and materials costs.

It also is an object of the invention to provide an editing system and method using one or more video signal sources, a storage and retrieval device, color correction circuits, and, in multiple-source systems, equipment for selecting video signals. Two or more sets of color correction values may be stored in the storage and retrieval device. The sets of color correction values are retrieved from the storage and retrieval device and applied to the color correction circuits. The color correction circuits respond to the sets of color correction values in order to color correct the video signals produced by the video signal sources. The color correction circuits form color corrected video signals from the video signals produced by the video signal sources. The edited, color-corrected video signals are recorded in a video recorder, thus forming a color corrected edited master. In addition to the advantages given above, this editing system can provide significant savings in equipment cost and/or improved color correction, and/or faster, easier operation than alternative systems or methods.

An editing system using multiple sources can use video switchers, and means for combining signals to produce special effects. In such systems the color correction equipment can be connected at various points between the signal sources and the recorder, with varying degrees of advantage.

An editing system according to the present invention preferably includes a control mechanism such as an editing computer. The control mechanism may automatically control the various components of the system in response to a predetermined set of instructions. Additionally or alternatively, the control mechanism may permit one or more of the components to be selectively controlled by an operator, i.e., the editor.

An editing system according to the present invention may process either composite video signals or component video signals. The color corrections made preferably include corrections to the hue and/or saturation for a plurality of separate colors (called "color vectors") of the video signals, as well as luminance corrections, in accordance with the teachings of the above-identified patents. Different sets of color correction values may be used to color correct the video signals from different scenes, frames or other portions of the associated recording medium. For instance, a different set of color correction values may be used for each scene in each recording medium, so as to enable scene-by-scene or frame-by-frame or section-by-section color correction. Moreover, the retrieval of the different sets of color correction values from a storage and retrieval device may be controlled according to a predetermined set of instructions.

An editing system according to the present invention also may provide corrections for audio parameters, such as audio level, and sound equalization. Other video parameters, such as image enhancement or sharpness, also can be corrected.

BRIEF DESCRIPTION OF THE DRAWINGS

The above and other objects, features, and advantages of the present invention will become apparent upon consideration of the following detailed description of illustrative embodiments thereof, especially when taken in conjunction with the accompanying drawings, wherein.

DETAILED DESCRIPTION OF THE PREFERRED EMBODIMENTS

Figure 1:
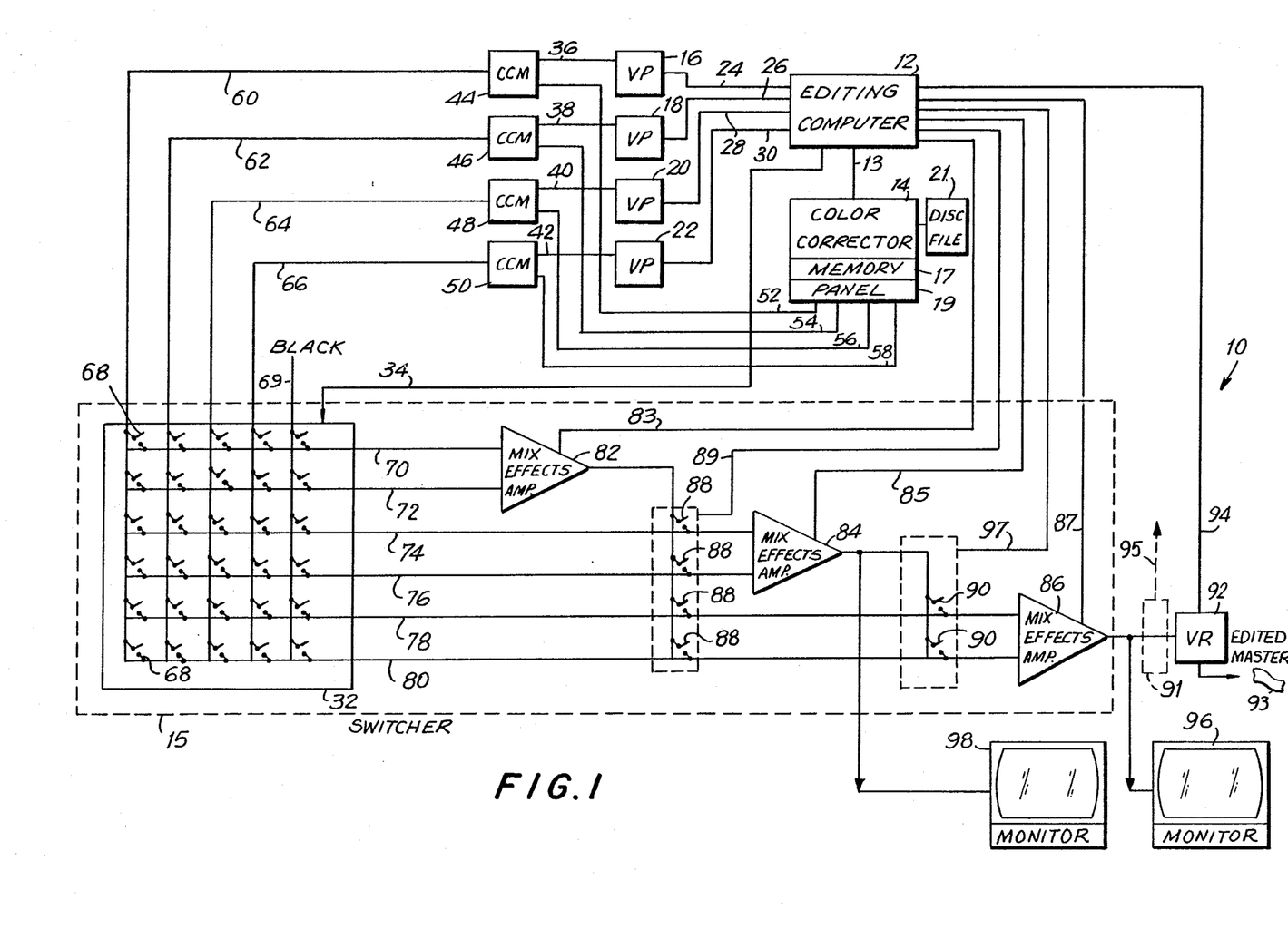
FIG. 1 is a block diagram of one embodiment of an editing system constructed according to the present invention.

FIG. 1 shows an editing system 10 constructed according to the present invention. The editing system 10 includes an editing computer 12 and a color corrector 14. The editing computer 12 is connected to video tape players 16, 18, 20, and 22 through control lines* 24, 26, 28, and 30, respectively, and to a switching unit 32 through a control line 34. The editing computer 12 and the color corrector 14 communicate through a line 13. The editing computer 12 and the color corrector 14 may communicate with one another in accordance with an SMPTE standard for communication between devices, or in accordance with some other standard.

As used herein, the term "line" means a lead with a single conductor as well as a cable with a plurality of conductors. For convenience in the drawings, a "line" is depicted by a single solid line, although the single solid line may represent a number of leads or conductors.

The editing computer 12 may be a conventional editing computer, such as a model CMX 340 editing computer manufactured by CMX/ORROX Corp. Also, the color corrector 14 preferably is a relatively sophisticated color corrector, such as a model "The System 60XL" color corrector manufactured by Corporate Communications Consultants, Inc. The color corrector 14 includes random access memory 17, and a control panel 19. Preferably, a disc file 21 also is provided. The color corrector 14 preferably has means for correcting the hue and/or saturation, luminance, color balance, and other features described in the patents identified above.

The editing system 10 includes a plurality of tape or disc players 16, 18, 20, and 22 as sources of video signals. However, other sources of video signals may be used. For instance, one or more of the video players 16, 18, 20, and 22 may be replaced by film-to-video converters such as film scanners, film chains, etc.

Figure 5A:
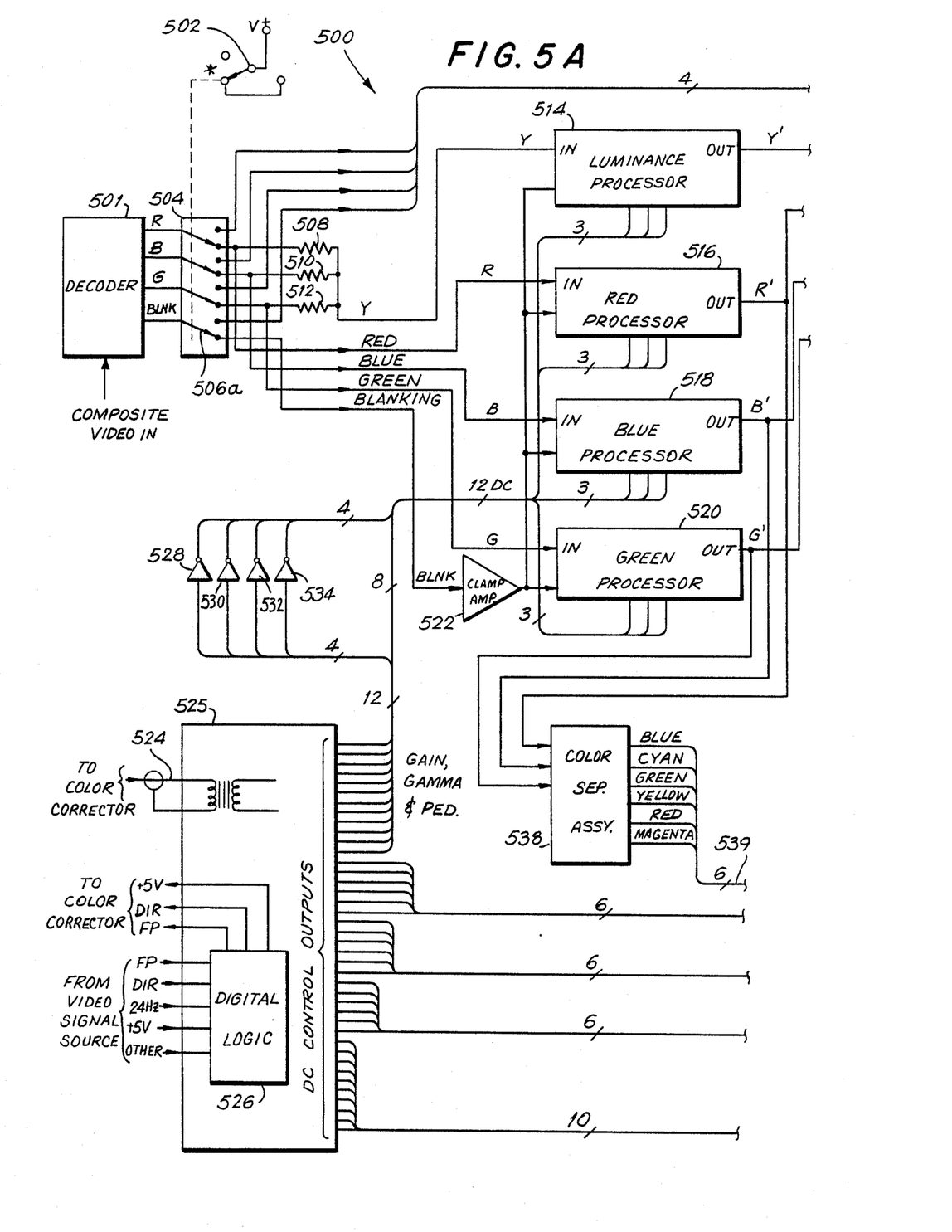
FIGS. 5A and 5B together form a schematic diagram of a portion of the structures shown in FIGS. 1 through 4.
Figure 5B:
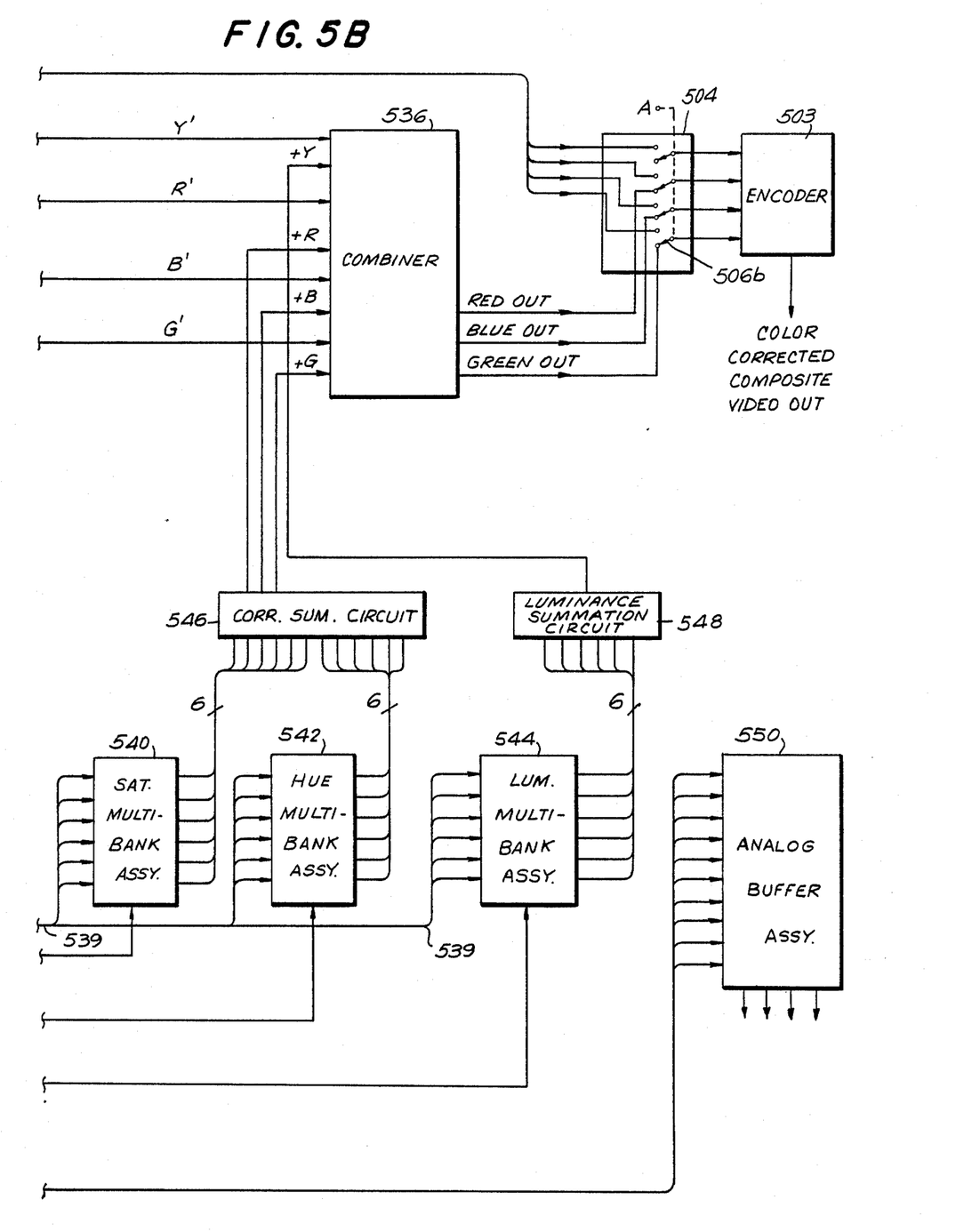

Each of the video players 16, 18, 20, and 22 produces video signals from the recording medium, e.g., the videotape or video disk, in it. The video signals from the video players 16, 18, 20, and 22 are sent through the lines 36, 38, 40, and 42, respectively, to color correction modules 44, 46, 48, and 50, respectively. The preferred circuitry of each color correction module is shown in FIGS. 5A and 5B and explained below. The color correction modules 44, 46, 48, and 50 color correct the input video signals from the video players 16, 18, 20, and 22, respectively. In order to color correct the video signals from the video players, the color correction modules 44, 46, 48, and 50 form color correction values based upon signals which are provided by the color corrector 14 through the lines 52, 54, 56, and 58, respectively.

Preferably, the color correction values used by the color correction modules are stored in a memory or storage and retrieval device in the color corrector 14. But other arrangements are possible. The color correction values may be stored in a memory or storage and retrieval device in the editing computer 12 or in a separate unit. At least one set of color correction values is stored for each of the recording media that are used in the video players.

The color correction modules 44, 46, 48, and 50 provide color corrected video signals as output signals. The color corrected video signals from the color correction modules 44, 46, 48, and 50 are conducted over lines 60, 62, 64 and 66 to the switching unit 32. The switching unit 32 has a number of switches 68. The switching unit 32 may be a conventional switching unit, for example, a model 1600 switching unit made by The Grass Valley Group, Inc. The switches 68 switch the video signals from any of the input lines 60, 62, 64, and 66 to any of the output lines 70, 72, 74, 76, 78, and 80. The output lines 70 and 72 are connected to a first mix-effects amplifier 82; the output lines 74 and 76 are connected to a second mix-effects amplifier 84; the output lines 78 and 80 are connected to a third mix-effects amplifier 86. Preferably, the mix-effects amplifiers 82, 84, and 86 receive control signals from the editing computer 12 over the control lines 83, 85, and 87, respectively. The mix-effects amplifiers 82, 84, and 86 may be conventional mix-effects amplifiers such as those sold as part of the above-identified switcher.

Four switches 88 are provided for selectively switching the video signals from the output of the mix-effects amplifier 82 to the lines 74, 76, 78, and 80. Two additional switches 90 are provided for selectively Two additional switches 90 are provided for selectively switching the video signals from the output of the mix-effects amplifier 84 to the lines 78 and 80, which are connected to the mix-effects amplifier 86. The switches 88 and 90 preferably are controlled by the editing computer 12, with control signals being sent over the lines 89 and 97, respectively.

The switching unit 32, the mix-effects amplifiers 82, 84, and 86, and the switches 88 and 90 may be part of a conventional video switcher device such as that described above.

A first monitor 96 is provided so that the operator may view video pictures formed by the output signals from the video switcher 15, and with a monitor 98, the operator may selectively view video pictures formed by the video signals at various points in the video switcher 15, e.g., at the output of the mix-effects amplifier 82 or at the output of the mix-effects amplifier 84. Preferably, the monitors 96 and 98 are controlled by the operator through the editing computer 12.

The video signals from the output of the mix-effects amplifier 86, that is, from the output of the video switcher 15, are sent to the video recorder 92, where the video signals are recorded on a recording medium to form the edited master tape 93. A conventional broadcast quality video tape recorder may be used as the video recorder, and conventional videotape may be used as the recording medium. However, other devices and media may be employed. The editing computer 12 controls the video recorder 92 through a control line 94.

EDITING PROCESS

The following description explains the editing process for images recorded on videotapes. However, it should be understood that the contents of other types of image recording media may be edited with an editing system according to the present invention.

In an on-line editing system, the videotapes containing the segments that make up the edited master are loaded into the video players 44, 46, 48, and 50. Of course, if the contents of only two or three videotapes are used to make up the edited master, only two or three video players are utilized. At least one set of color correction values for each or all of the videotapes is stored in a memory or storage and retrieval device 17 forming a part of the color corrector 14. If desired, a separate color correction for each scene needing color correction on each video tape can be stored in memory, thus providing corrections on a scene-by-scene or frame-by-frame basis.

The color correction values, and the locations at which they are to be used, are determined in a preliminary review of each input tape, using the color corrector 14 to set and store the correction values and their locations, e.g., the frame count at which each set of correction values is to be used, if more than one set of values is to be used for a given input tape.

Preferably, the color corrector used has the capability of correcting the hue and/or saturation of the colors, as does the equipment sold by Corporate Communications Consultants, Inc. and described in the "Rainbow" U.S. Pat. No. 4,096,523, and other equipment sold and used for the relatively sophisticated color correction of video signals. Preferably, the color corrector also uses the luminance control provided by the "Luminance" U.S. Pat. No. 4,410,908, and the other features of the "Anamorphic" U.S. Pat. No. 4,223,343 and the pending patent applications identified above.

If preferred, the color corrections can be made and stored in a separate color corrector having the same capabilities as those of the corrector 14. The corrections and their locations can be stored on a magnetic disc or tape, and then can be loaded into a disc or tape drive in the corrector 14 to be stored in the memory 17.

If an off-line system has been used first, a magnetic disc or tape containing an editing list or a decisions list is loaded into the editing computer 12. Based upon the stored list, the editing computer 12 prerolls the video players so that the required portion of the videotape is available when necessary. The editing computer 12 instructs the color corrector 14 to read each set of color correction values out of memory and supply suitable signals to the appropriate color correction module 44, 46, 48, and 50 over the lines 52, 54, 56, and 58.

If an off-line system is not used first, an operator may control the editing computer 12 and the color corrector 14 manually. In addition, an operator may manually override the automatic controls for any of the components. For instance, if the operator observes that the color correction values for a videotape are inadequate, the operator may manually adjust the controls on the color corrector 14 to alter the color correction values and improve the appearance of the color corrected video signals. Additionally, the operator may manually adjust the controls on the editing computer 12 to selectively control the video players 16, 18, 20, and 22, the switching unit 32, the mix-effects amplifiers 82, 84, and 86, the switches 88 and 90, and the video recorder 92. Manual adjustments may occur at any time during the on-line editing process.

The editing computer 12 controls the video players 16, 18, 20, and 22 so that they generate video signals from the associated videotape when needed during the editing process. Depending upon what the operator desires as the contents of the edited master, one or more of the video players may be generating video signals from the associated videotape. The video signals from the video players 16, 18, 20, and 22 are conducted over the lines 36, 38, 40, and 42, respectively, to the color correction modules 44, 46, 48, and 50, respectively. The color correction modules color correct the video signals from the video players using the color correction information that was provided by the color corrector 14. Consequently, the color correction modules furnish color corrected video signals at their outputs. The color corrected video signals travel over the lines 60, 62, 64, and 66 to the switching unit 32.

The switching unit 32 has a number of switches 68. The switches 68 are arranged to allow video signals on any of the input lines 60, 62, 64, and 66 to be directed to any of the output lines 70, 72, 74, 76, 78, and 80. Accordingly, color corrected video signals from any of the color correction modules 44, 46, 48, and 50, which are formed from the video signals provided by the video players, may be routed to any of the mix-effects amplifiers 82, 84, and 86. This routing of video signals is controlled by the editing computer 12, which sends suitable control signals to the switching unit 32 over the control line 34.

In addition to the input signals from the color correction modules 44, 46, 48, and 50, the switching unit 32 may also receive other input signals. As an example, a black input signal is supplied to the switching unit 32 on line 69, as shown in FIG. 1. The black input signal is useful for producing certain effects, such as a fade-to-black effect. The switches 68 direct the black signal to any of the output lines 70, 72, 74, 76, 78, and 80. Although only a black signal is shown, various other input signals may also be supplied to the switching unit 32.

As indicated previously, the mix-effects amplifiers 82, 84, and 86 may be conventional devices. These devices take two different video signals as input signals, combine the input video signals in some fashion, and produce an output video signal. Typically, a mix-effects amplifier is capable of implementing several types of effects, such as "dissolves", "wipes", and "keys".

A "dissolve" is produced when the images at the end of a scene blend into the images at the beginning of the next scene. In other words, a dissolve is generated by superimposing the images from one scene upon the images from another scene while gradually increasing the intensity of one image and decreasing the intensity of the other. Usually, the images for the two scenes are recorded on different videotapes, which are loaded into different video players.

A "wipe" is a composite picture made up of images from two different scenes. For instance, images from one videotape may form the top half of a video picture, while images from another videotape may form the bottom half of the picture. Furthermore, several wipes may be used to divide the video picture into quadrants, with a different image in each quadrant. Wipes may also be employed to divide the screen in other ways, e.g., into three rectangular portions or into several triangular portions. For a wipe, a timing circuit determines when the transition between the input video signals should be made.

A "key" is similar to a wipe, except that a video image, rather than a timing circuit, determines when the transition between the input video signals should be made. For example, with a key the image of a person may be inserted into a background image; the image of the person controls the switching between the input video signals The mix-effects amplifier 82 enables various effects to be produced with the video signals on the lines 70 and 72. The mix-effects amplifiers 84 and 86 together with the switches 88 and 90 enable more effects or modified effects to be produced. Namely, the cascade configuration of the mix-effects amplifiers 82, 84, and 86 permits several split-screen images, e.g., four, to be combined in one video picture. Additionally, this configuration allows effects within effects, such as a dissolve within a wipe.

As noted before, the color correction modules 44, 46, 48, and 50 produce color corrected video signals. The editing computer 12 controls the switching unit 32, the mix-effects amplifiers 82, 84, and 86, and the switches 88 and 90. Accordingly, the color corrected video signals from the color correction modules are routed by the switches 68 of the switching unit 32 and supplied as input signals to the mix-effects amplifiers 82, 84, and 86, which then combine the signals as commanded by the editing computer 12. Consequently, each of the mix-effects amplifiers 82, 84, and 86 employs color-corrected signals when combining video signals. Therefore, following a wipe, the video pictures in each portion of the screen are color corrected. Similarly, following a key, the video pictures inside of the key and the video pictures outside of the key are color corrected. In addition, the video pictures in a dissolve require fewer or no color corrections since both of the images forming the dissolve have been color corrected separately.

Known editing systems lack the capability of producing high-quality color corrections. Such corrections can be provided by color correcting each separate tape prior to editing, or the edited master can be color corrected after the editing process is complete. However, either prior method requires an additional recording of the video signals—a step which degrades the quality of the recorded images. In addition, we have recognized that those prior methods add substantially to the time and expense of the preparation of the program tape.

The editing system 10 may also control the editing of the sound track for the edited master. If so, the editing system 10 may be used to provide corrections for the sound track for the edited master. For instance, the editing computer 12 or even the color corrector 14 may store corrections for audio parameters, such as audio level, sound equalization, and video parameters such as image enhancement or sharpness.

The editing system 10 may be used in an off-line editing process to prepare an editing list or a decisions list and to select suitable color correction values for each of the videotapes which form part of the edited master. The operator, through the controls on the editing computer 12, controls the video players 16, 18, 20, and 22 and the other components of the editing system. The operator identifies which components are to be used at different times during the formation of the edited master. The operator causes signals indicative of the various turn-on, turn-off, and switching points to be stored. These stored signals form the editing list or the decisions list. The different switching points may be specified as hours, minutes, seconds, and frames in accordance with the code established by the SMPTE, or another code may be used.

The operator also adjusts the controls on the color corrector 14 until a desirable set of color correction values is obtained for each of the videotapes being edited. The sets of color correction values are stored, under the control of the operator, in the RAM memory 17 in the color corrector. One set of color corrections may be used for an entire videotape. That is, the same set of color correction values may be used for every scene on a videotape. Alternatively, several sets of color correction values may be determined for a videotape. Namely, different sets of color correction values may be used for different scenes on the videotape. But if a set of color correction values is satisfactory, the set of color correction values may be used for several scenes (or even all of the scenes) on a videotape. The Rainbow patent, the Luminance patent, and the Amamorphic patent discuss how a set or several sets of color correction values may be determined and used to color correct video signals.

A portion of the memory 17 in the color corrector 14 may be allocated to each video source. Accordingly, all of the sets of color correction values for the corresponding videotape or videotapes may be stored in the associated portion of the memory. The location at which a set of color correction values is to be read from the memory may be identified by a code for the videotape or the video player together with a code specifying the frame, such as the SMPTE code point (hours, minutes, seconds, and frames). Other codes may be used, e.g., a code indicating the videotape or video player, the reel number, and the scene number.

Once the editing list or the decisions list has been specified and the sets of color correction values have been obtained in an off-line system, the storage media containing this information are loaded into the editing computer and the color corrector in an on-line editing system. The on-line editing system, e.g., the editing system 10, may automatically make the edited master based upon the stored information. If several sets of color correction values were determined for a videotape, each set is read automatically at the appropriate time. Alternatively, the operator may selectively control any of the components manually to change the arrangement of videotape segments forming the edited master, produce different effects, alter any of the color correction values in a set of color correction values, or otherwise modify the edited master.

SINGLE CORRECTION MODULE EMBODIMENT

In an alternative embodiment, also shown in FIG. 1, a complete color correction unit 91 is connected at the input of the edited master tape recorder 92. The unit 91 includes a complete color corrector 14, with memory 17, control panel 19 and disc file 21, and is connected to the editing computer 12 over a line 95. The unit 91 also includes one color correction module like the module 500 shown in FIGS. 5A and 5B, and units 44, 46,48 and 50 shown in FIG. 1. The single unit 91 is used instead of color correctors at any other location in the editing system.

Location of the color correction equipment at the input to the master tape recorder 92 has several advantages. First, it reduces the number of CCM modules required to one. In fact, the unit 91 can be nothing more than one of the sophisticated color correctors made by Corporate Communications Consultants, Inc. and identified above. Therefore, as compared with other embodiments, this embodiment is less expensive.

Another advatage, which is the same as for the other embodiments, is that re-recording and the consequential degradation of signal quality are avoided.

A further advantage, also shared with the other embodiments, is that, as we have discovered, inclusion of the color corrector within the editing system gives a considerable savings in time and labor required for color correction.

Of course, location of the color correction module 500 of the unit 91 at the input of the master tape recorder instead of one of the other locations used in other embodiments reduces the ability to separately connect each portion of a split-screen picture formed by a "wipe" or a "key", but it may be entirely adequate in some uses. In fact it may make the color corrector usale in some systems in which the cost of the other embodiments would prohibit their use.

SINGLE SOURCE EMBODIMENT

Another embodiment also is included in FIG. 1. A simple editing system known as an "Auto Assembly" system consists of simply the editing computer 12, and of the video player 16 and a video recorder 92. The "decisions list" developed for the editing computer includes information instructing the computer 12 on how to record segments from different reels or cassettes of tape at different locations on the edited master tape when the tapes or films are played one after another on a single player, rather than on separate players operated in sequence.

Typically, where an edited master is formed from several different tapes, each on its own reel, the first tape will be played and a selected scene recorded on the edited master tape. If the next segment on the edited master tape comes from another reel, a space will be left on the edited master tape for that segment. Then, each other segment from the first tape is recorded at its predetermined location on the edited master tape. Then, the next tape reel is played, the edited master tape is returned to the start of the empty space to be filled from the second tape, and a selected segment from the second tape is recorded in that space. This procedure is continued until the edited master tape is completed. The locations for each segment, the reel from which it comes, and all other operational instructions have been prerecorded on a floppy disc or the like, and read into the editing computer 12. An operator need only change input tape reels when the need is indicated by the computer 12, and load and unload program material and tape from the recorder 92. Otherwise, the system operates automatically.

The editing system here described is less expensive to build than those using multiple video sources because it does not need a switcher and needs only one player. The fact that it cannot create dissolves or certain other special effects is not a detriment for many jobs in which only "cuts" (changes) from one video signal source to another are involved, or where the special effects are handled by alternative procedures. The system also can be less expensive to operate because it is fully or semi-automatic in operation.

The embodiment of the invention described here adds to the foregoing color corrector 14, memory 17, control panel 19, disc file 21, and one color correction module 44 connected between the output of player 16 and the VTR 92. The player 16 is connected to editing computer 12 by line 24, and the color corrector is connected to the computer 12 by the line 13. The other video players 18, 20, 22 and the switches 15 have been eliminated.

As in the other embodiments, the color corrections for each input tape or film or each scene or segment thereof to be used, are stored in the memory 17 or in the memory of the editing computer, and are recalled from memory and applied to the color correction module 44 to apply the appropriate corrections for the segment from the appropriate reel when that segment appears for reproduction.

This alternative embodiment of the invention shares with the other embodiments the advantages that it allows the use of sophisticated corrections, such as hue and saturation of the separate color vectors, luminance correction by use of the same vectors, etc., without a separate re-recording and degradation of the quality of the video signals, and without the extra time, materials and space that such a separate color correction operation entails.

The system and methods described above can be used in a single-reel editing job, such as where the only change required is to delete one or two scenes, for example. The color corrections are provided in the manner described above.

In any of the foregoing embodiments, the color corrections can be stored directly on the video tape or disc bearing the recorded images, either adjacent the scenes to be corrected, or at a separate location in the tape. The tape player can include color correction circuitry responsive to the stored signals to color correct the signals produced by the player.

COLOR CORRECTION MODULE

FIGS. 5A and 5B show a color correction module 500 such as module 44, 46, 48 or 50 of FIG. 1. The module 500 includes a decoder 501 (FIG. 5A) which forms the component video signals red ("R"), blue ("B"), and green ("G") from composite video signals received from one of the tape players 16, 18, etc. The module 500 also includes an encoder 503 (FIG. 5B) which encodes the color-corrected R,G,B signals to form a color-corrected composite video output signal.

Referring first to FIG. 5A, the decoder 501 produces a blanking signal which corresponds to the blanking interval in the picture information. A switch 502 controls a relay 504 with contacts 506a (FIG. 5A) and 506b (FIG. 5B). FIGS. 5A and 5B depict the relay 504 in its energized condition. With the contacts 506a and 506b in the positions shown in FIGS. 5A and 5B, the R, B, G, and blanking signals are conducted to the signal processing circuits in the color correction module 500. With the contacts 506a and 506b in the other position, the R, B, G, and blanking signals bypass the signal processing circuits in the color correction module 500. An operator may desire that the signal processing circuits be bypassed so that diagnostic tests may be performed.

Usually, however, the R, B, G, and blanking signals will be sent to the signal processing circuits in the color correction module 500. The R, B, and G signals are combined by the resistors 508, 510, and 512 to produce a luminance signal ("Y"). The values for the resistors 508, 510, and 512, are selected so that appropriate proportions of the R, B, and G signals are used to generate the Y signal. For instance, the resistors 508, 510, and 512 may be selected so that Y is made up of 30% R 59% G, and 11% B. The resistors 508, 510, and 512 may be part of a standard luminance resistor matrix, such as the standard luminance resistor matrix 83 which is illustrated in the Luminance U.S. Pat. No. 4,410,908.

The Y, R, B, and G signals are sent to a luminance processor 514, a red processor 516, a blue processor 518, and a green processor 520, respectively. The blanking signal is conducted to a clamp pulse amplifier 522, the output of which is delivered to each of the processors 514, 516, 518, and 520. The clamp pulse amplifier 522 inverts the blanking signal and increases the magnitude of the inverted signal. The output signal from the clamp pulse amplifier 522 is termed the clamping pulse, and its period denotes the D.C. level of the video signal. The clamping pulse is supplied to each of the processors 514, 516, 518, and 520.

The color correction module 500 receives information serially from the color corrector through a coaxial cable 524. Pulses identifying the specific D.C. control channel and the associated D.C. control voltage are delivered over the coaxial cable 524. Various known coding techniques for the pulses may be employed. For instance, the pulses indicative of a specific D.C. control channel contain binary coded information, while the associated pulse representative of the D.C. control voltage is pulse height modulated. That is, the height of the later pulse denotes the amplitude of the D.C. control voltage for the specific D.C. control channel.

The coaxial cable 524 terminates in a serial receiver 525. The serial receiver 525 includes a serial-to-parallel converter with a shift register which converts the serial pulses indicative of the specific D.C. control channel into parallel information. The serial receiver 525 also includes a demultiplexer and sample-and-hold circuits for the pulses representative of the D.C. control voltages. The demultiplexer is controlled by the output of the shift register. The color correction module 500 may also receive information from the video signal source. For example, the color correction module 500 shown in FIG. 5A receives frame pulse ("FP"), direction ("DIR"), 60-Hz, and power supply signals from the video signal source. These signals are inputs to digital logic circuits 526. The digital logic circuits 526 are located in the serial receiver 525. The digital logic circuits 526 advantageously send these signals to the color corrector so that the color corrector may, for example, supply signals for the next scene at the proper time. Based upon the signals provided by the color corrector, the color correction module 500 produces D.C. control signals on the D.C. control output lines at the output of receiver 525. If the color correction module is located as shown by reference numeral 91, the D.C. control signals are also a function of the signals provided by the video signal source.

The color correction module 500 illustrated in FIG. 5A provides D.C. control signals for the gain, gamma, and pedestal for each of the Y, R, B, and G signals. Each of these twelve D.C. control signals is supplied to the appropriate processor, with the four D.C. control signals for the pedestal being inverted by the inverters 528, 530, 532, and 534. Each of the processors 514, 516, 518, and 520 is a conventional circuit, such as the "H Processors" 100 and 102 shown in the Rainbow patent or the processors 76, 78, 80 illustrated in the Luminance patent. The output signals from the processors 514, 516, 518, and 520 are designated as Y', R', B', and G', respectively.

The output signals from the processors 514, 516, 518, and 520 are supplied to a combiner 536, which is depicted in FIG. 5B. Moreover, the output signals from the processors 516, 518, and 520 are provided to a color separator assembly 538 (FIG. 5A). The color separator assembly 538 may be a conventional color separator assembly, such as the color separator circuit 96 illustrated in the Luminance patent.

The color separator assembly 538 receives the R', B', and G' signals from the processors 516, 518, and 520, respectively. The R', B', and G' signals are the R, B, and G signals, respectively, with adjustments in gain, gamma, and/or pedestal. The R', B', and G' signals, like the R, B, and G signals, contain luminance information. The color separator assembly 538 forms derivative color signals from the R', B', and G' signals. More particularly, the color separator assembly 538 forms color signals representing blue, cyan, green, yellow, red, and magenta. The derivative color signals do not include luminance information, and, therefore, they may be called pure color signals. Each derivative color signal represents the amount of that particular color in the video signal. For example, the blue derivative color signal represents the amount of the color blue in the video signal.

The output signals from the color separator assembly 538, namely, the derivative color signals, are sent over a line 539 to a saturation multibank assembly 540 (FIG. 5B), a hue multibank assembly 542, and a luminance multibank assembly 544. Each of the multibank assemblies 540, 542, and 544 includes six four-quadrant analog multipliers. Each of the four-quadrant analog multipliers has, as a first input signal, one of the derivative color signals from the color separator assembly 538. Each of the multibank assemblies 540, 542, and 544 receives six D.C. control signals, one D.C. control signal for each of the derivative color signals. Accordingly, each of the four-quadrant analog multipliers has as a second input signal one of the D.C. control signals. These D.C. control signals correspond to the settings of the controls of a color corrector which adjust the hue, saturation, and luminance of various colors, preferably blue, cyan, green, yellow, red, and magenta. As noted before, the color correction module 500 forms these D.C. control signals based upon the information provided by the color corrector. Each multiplier scales the associated derivative color signal in accordance with the level of the associated D.C. control signal. Consequently, the output signals from a multibank assembly are scaled versions of the input signals to the multibank assembly.

The output signals from the saturation multibank assembly 540 and the output signals from the hue multibank assembly 542 are sent to a correction summation circuit 546. The correction summation circuit 546 advantageously includes a resistor network for combining the signals from the saturation multibank assembly 540 and the signals from the hue multibank assembly 542 to produce correction signals, which are identified as +R, +B, and +G in FIG. 5B. The values for the resistors of the resistor network are appropriately selected so that the signals from the multibank assemblies 540 and 542 are combined in suitable proportions. The correction summation circuit 546 is a known circuit.

The output signals from the luminance multibank assembly 544 are sent to a luminance summation circuit 548. The luminance summation circuit 548 preferably includes a resistor network for combining the signals from the luminance multibank assembly 544 to produce a luminance correction signal, which is denoted as +Y in FIG. 5B. Each resistor in the resistor network may have the same value. Thus, the luminance summation circuit 548 may be formed from six resistors, each having the same value. The six resistors are connected together at one end. The other end of each resistor receives one of the output signals from the luminance multibank assembly 544. The luminance summation circuit 548 is a known circuit.

The output signals +R, +B, and +G from the correction summation circuit 546 and the output signal +Y from the luminance summation circuit 548 are conducted to the combiner 536. In addition to the signals from the correction summation circuit 546 and the luminance summation circuit 548, the combiner 536 receives the Y', R', B', and G' signals from the processors 514, 516, 518, and 520, respectively. The combiner 536 resistively adds the input signals and produces color corrected signals.

Specifically, the combiner 536 adds the R' and +R signals to form a color corrected red signal (R"), adds the B' and +B signals to form a color corrected blue signal (B"), and adds the G' and +G signals to form a color corrected green signal (G"). In addition, the combiner 536 adds the Y' and +Y signals to form a corrected luminance signal (Y"). The R", B", and G" signals are combined internally in the combiner in standard proportions to derive a luminance signal L. This luminance signal L is subtracted from each of the R", B", and G" signals to generate color difference signals (R"-L, B"-L, and G"-L). Then, the corrected luminance signal (Y") is added to each of the color difference signals. In this manner, luminance information (Y") is added into the respective color difference signals, thus producing red, blue, and green color channels.

The color corrected signals in the combiner 536 are amplified by standard amplifiers in the combiner 536. The color corrected signals are amplified to suitable levels for transmission to a remote location. The color corrected output signals from the combiner are sent through the contacts 506b of the relay 504 to the encoder 503.

Besides the D.C. control signals for the processors 514, 516, 518, and 520 and the D.C. control signals for the multibank assemblies 540, 542, and 544, the color correction module 500 may provide other D.C. control signals. As an example, the color correction module 500 forms ten D.C. control signals from the information supplied by the color corrector and the video signal source. These D.C. control signals are conducted to an analog buffer assembly 550. From the analog buffer assembly 550, these D.C. control signals may be sent to remote locations, such as the video signal source, the video switcher, or the editing computer. These D.C. control signals may be used to permit the video signal source to be controlled through, for example, the color corrector. The analog buffer assembly 550 includes a conventional operational amplifier for each input signal. Preferably, each operational amplifier has gain and offset adjustments.

FIG. 2 EMBODIMENT

Figure 2:
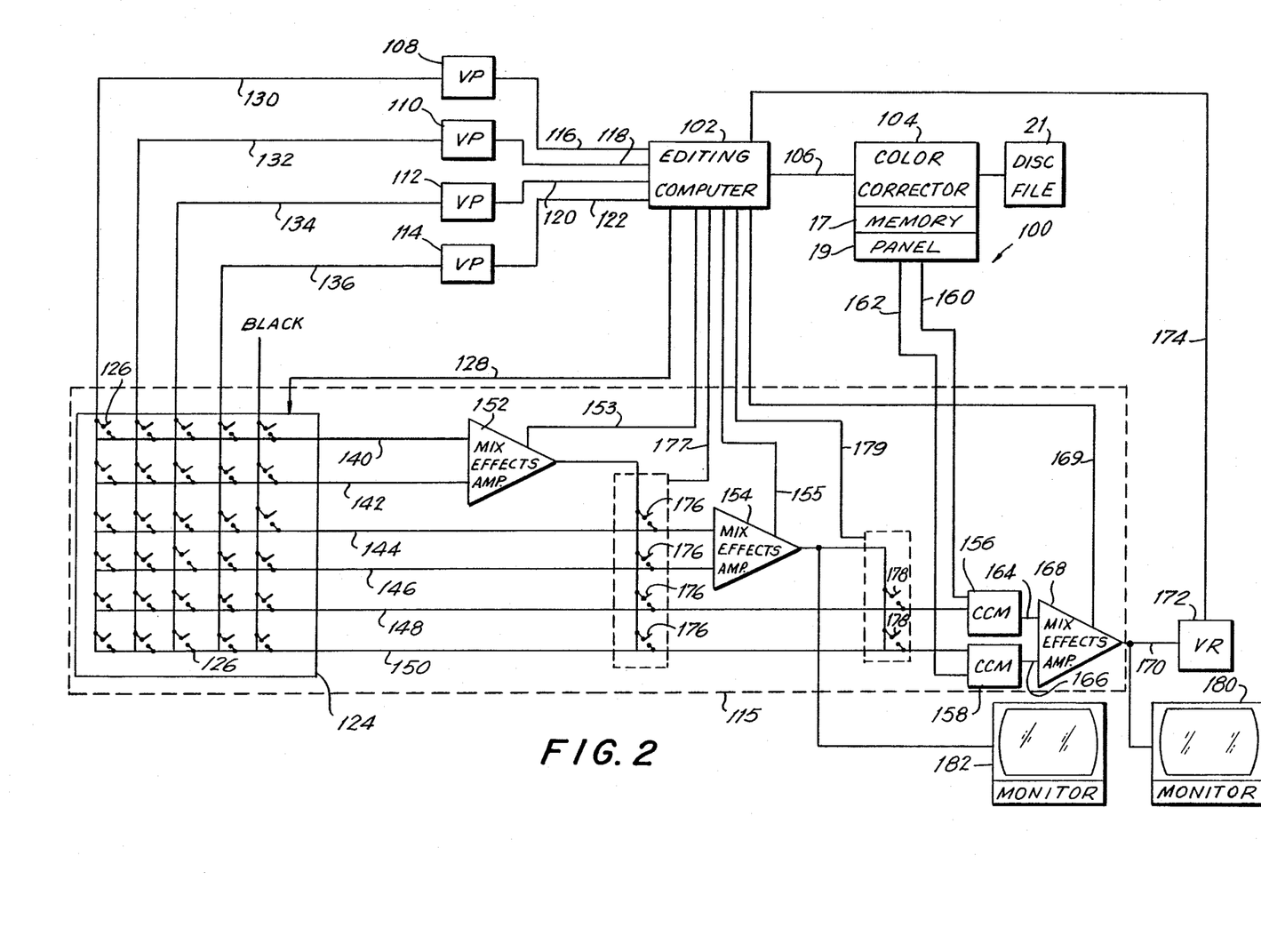
FIG. 2 is a block diagram of another embodiment of the editing system of the present invention.

FIG. 2 illustrates another embodiment of an editing system according to the present invention. FIG. 2 shows an editing system 100 with an editing computer 102 and a color corrector 104. The editing computer 102 and the color corrector 104 communicate through a line 106. As with the embodiment depicted in FIG. 1, conventional devices may be employed for the editing computer 102 and the color corrector 104. The editing system 100 includes video players 108, 110, 112, and 114, which are controlled by the editing computer 102 through the control lines 116, 118, 120, and 122, respectively. The editing system 100 also includes a switching unit 124, which has a number of switches 126, and which is controlled by the editing computer 102 through a control line 128.

The video signals from the video players 108, 110, 112, and 114 are conducted over the lines 130, 132, 134, and 136, respectively, to the switching unit 124. The switches 126 of the switching unit 124 route the video signals on the various input lines 130, 132, 134, and 136 to the various output lines 140, 142, 144, 146, 148, and 150.

From the switching unit 124, the output lines 140 and 142 are connected to a mix-effects amplifier 152, the output lines 144 and 146 are connected to a mix-effects amplifier 154, and the output lines 148 and 150 are connected to color correction modules 156 and 158, respectively. The color correction modules 156 and 158 receive signals from the color corrector 104 over the lines 160 and 162, respectively. The color correction modules color correct the input video signals. A suitable color correction module is shown in FIGS. 5A and 5B and described above, but other color correction circuits may be used. For instance, color correction circuits with manually adjustable color correction settings may be employed, and the color corrector 104 together with the control lines 160 and 162 may be eliminated.

The color correction modules 156 and 158 supply color corrected video signals over lines 164 and 166 to a mix-effects amplifier 168, which sends its output video signals over a line 170 to a video recorder 172. The video recorder 172 is controlled by the editing computer 102 through a control line 174. Additionally, the switches 176 switch the video signals from the mix-effects amplifier 152 to the lines 144, 146, 148, and 150, and the switches 178 switch the video signals from the mix-effects amplifier 154 to the lines 148 and 150. The editing computer 102 controls the mix-effects amplifiers 152, 154, and 168 through the control lines 153, 155, and 169, respectively. Also, the editing computer 102 controls the switches 176 and 178 through the control lines 177 and 179, respectively.

The switching unit 124, the mix-effects amplifiers 152, 154, and 168, and the switches 176 and 178 may be part of a conventional video switcher. The video switcher is indicated by the dashed line and designated by the reference numeral 115 in FIG. 2. The conventional video switcher 115 in FIG. 2 is modified by including the color correction modules 156 and 158 at the input lines of the last mix-effects amplifier in the cascade of mix-effects amplifiers.

A monitor 180 is connected to the output of the video switcher 115, and a monitor 182 is connected to the video switcher 115. With the monitor 180, the operator may observe video pictures formed by the output signals from the video switcher 115. With the monitor 182, the operator may selectively observe video pictures formed by the video signals at various points in the video switcher 115, e.g., at the output of a mix-effects amplifier or at the output of a color correction module. The monitors 180 and 182 are controlled by the operator through the editing computer 102.

The editing system 100 of FIG. 2 may be operated like the editing system 10 of FIG. 1. The editing system 100 may be utilized as an on-line system or an off-line system. The color corrector 104 stores sets of color correction values for the various segments of the videotapes that make up the edited master. A portion of the memory in the color corrector 104 may be allocated to and associated with each of the color correction modules. A suitable code is used to specify when a set of color correction values is to be read from the memory and supplied to a color correction module.

The editing system 100 of FIG. 2 employs two color correction modules, while the editing system 10 of FIG. 1 uses four color correction modules. Thus, the editing system 100 is less costly than the editing system 10. The two color correction modules of the editing system 100 may provide satisfactory color corrections for almost any effect that the video switcher 115 can produce.

FIG. 3 EMBODIMENT

Figure 3:
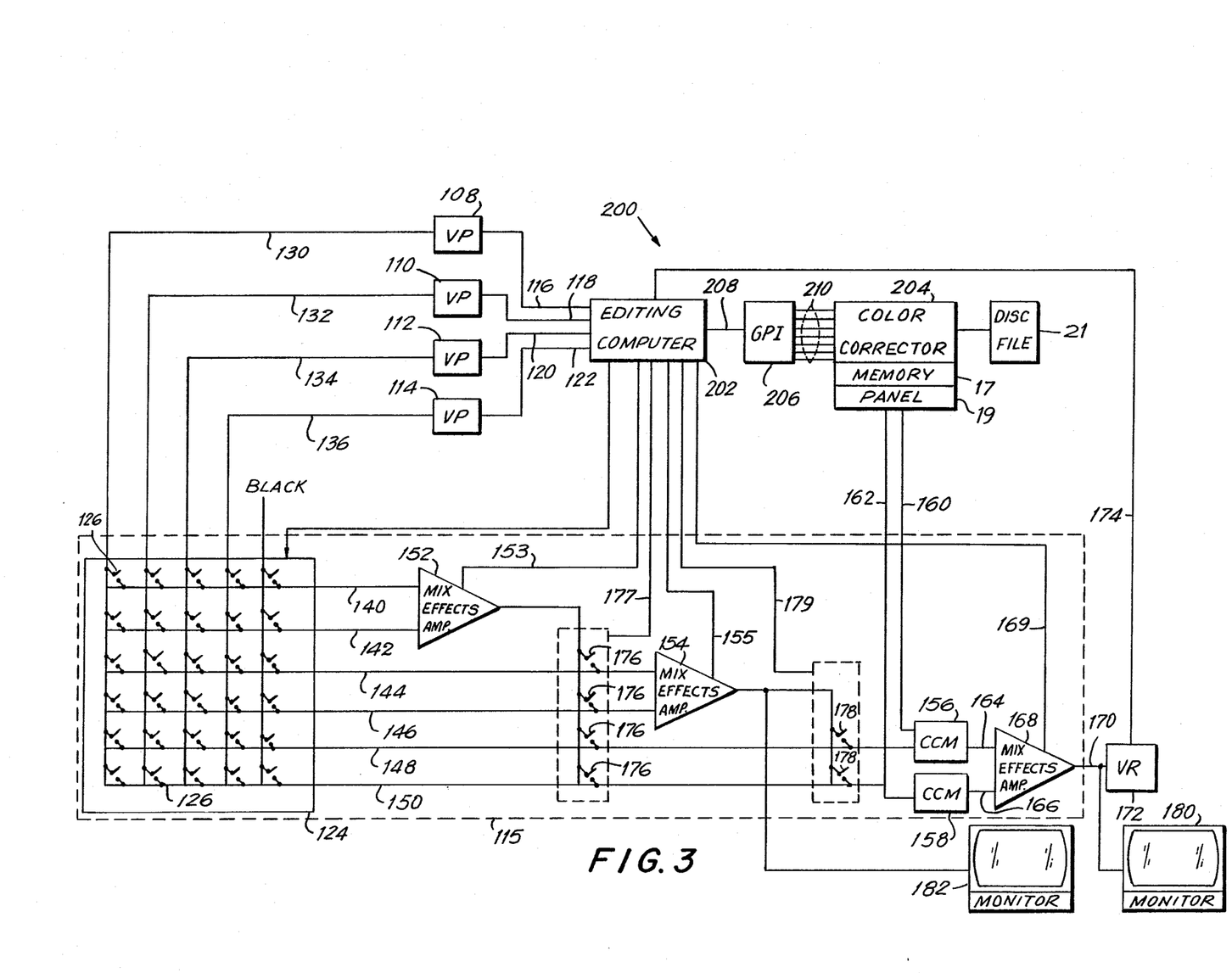
FIG. 3 is a block diagram of yet another embodiment of the editing system of the present invention.

FIG. 3 illustrates a further embodiment of an editing system according to the present invention. The embodiment of FIG. 3 is a modification of the embodiment of FIG. 2, and identical components of the editing systems are denoted by identical reference numerals. FIG. 3 shows an editing system 200 with an editing computer 202 and a color corrector 204. The editing computer 202 communicates with the color corrector 204 through a general purpose interface ("GPI") 206. The GPI 206 receives input signals from the editing computer 202 over a line 208 and sends output signals to the color corrector 204 over the lines 210.

The GPI 206 provides a signal over one of the output lines 210 in response to an input signal on the line 208, and no signals are provided over the other output lines 210. That is, the signal on one of the output lines 210 changes state in response to an input signal, while signals on the other output lines 210 do not change state in response to the input signal. A different input signal causes the signal on a different output line to change state. The GPI 206 is analogous to a data latch which receives an input signal, e.g., an n-bit binary input signal, and produces an output signal on one or more of a number of output lines. A conventional GPI may be employed for the GPI 206. For example, a GPI manufactured by CMX/ORROX may be used. Known GPIs which are sold as part of an editing system may be employed. In fact, many known editing computers have a GPI that is suitable for a system according to the present invention.

The color corrector 204 responds to a signal on one of the lines 210 by supplying signals corresponding to a set of color correction values to one or both of the color correction modules 156 and 158. For example, if the mix-effects amplifier 168 is combining video signals to produce a wipe, a signal on the appropriate one of the lines 210 causes the color corrector 204 to send signals corresponding to one set of color correction values to the color correction module 156 and to send signals corresponding to another set of color correction values to the color correction module 158. Based upon the data provided by the color corrector 204, the color correction modules 156 and 158 form color corrected video signals from the input video signals. The color corrected video signals are conducted over the lines 164 and 166 to the mix-effects amplifier 168, which combines them as commanded by the editing computer 202 to produce the wipe.

The color corrector 204 may store a set of color correction values for each scene of each videotape segment that is part of the edited master. One set of color correction values may, however, be used for several scenes. In fact, one set of color correction values may be used for every scene on a videotape, if the set provides acceptable color corrections.

If the editing computer communicates with the color corrector through a GPI, as shown in FIG. 3, a conventional editing computer may be used, and reprogramming of the editing computer is unnecessary.

FIG. 4 EMBODIMENT

Figure 4:
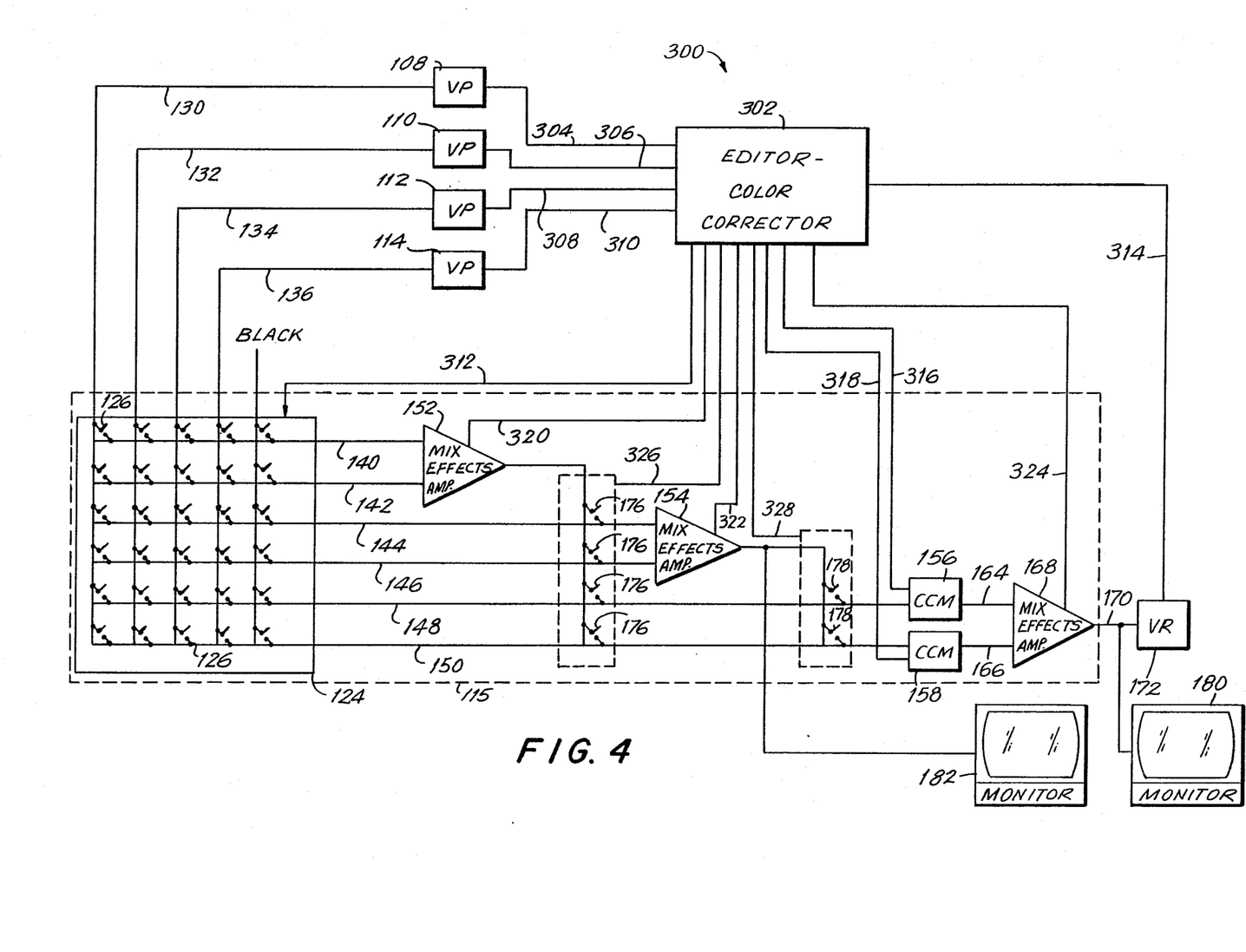
FIG. 4 is a block diagram of still another embodiment of the editing system of the present invention.

FIG. 4 depicts an additional embodiment of an editing system according to the present invention. The embodiment of FIG. 4 is a variation of the embodiments of FIGS. 2 and 3. Accordingly, identical components of the editing systems are denoted by identical reference numerals. FIG. 4 illustrates an editing system 300 with an editor-color corrector 302. The editor-color corrector 302 of the FIG. 4 embodiment replaces the editing computer 102 and the color corrector 104 of the FIG. 2 embodiment and the editing computer 202, the color corrector 204, and the GPI 206 of the FIG. 3 embodiment. In other words, the functions and features of the editing computer and the color corrector are integrated in a single piece of equipment, i.e., the editor-corrector 302.

The editor-corrector 302 controls the video players 108, 110, 112, and 114 through the control lines 304, 306, 308, and 310. Moreover, the editor-corrector 302 controls the switching unit 124 through the control line 312 and the video recorder 172 through the control line 314. The editor-corrector 302 also supplies color correction information to the color correction modules 156 and 158 through the lines 316 and 318, respectively. The editor-corrector 302 controls the mix-effects amplifiers 152, 154, and 168 through the control lines 320, 322, and 324, respectively, and it controls the switches 176 and 178 through the control lines 326 and 328, respectively.

In the system 300, the information for the editing list or the decisions list may be stored together with the color correction information. That is, the information for the switching points, the information for combining video signals, and the color correction information may be stored in a single storage medium. Subsequently, during the editing process, the information is retrieved at appropriate times and used to control the components of the editing system 300.

The editing system 300 may control the editing of the sound track for the edited master. If so, the editor-corrector 302 may be used to provide corrections for the sound track for the edited master. For instance, the editor-corrector 302 may store corrections for audio parameters, such as audio level and sound equalization. Other video parameters, such as image enhancement or sharpness also can be corrected.

The editing systems discussed above process composite video signals. An editing system according to the invention may also process component video signals.

Although particular illustrative embodiments of the present invention have been described herein with reference to the accompanying drawings, the present invention is not limited to these particular embodiments. Various changes and modifications may be made thereto by those skilled in the art without departing from the spirit or scope of the invention, which is defined by the appended claims.

What is claimed is:

1. An editing system, comprising:
   first source means for producing video signals from a first recording medium;
   second source means for producing video signals from a second recording medium;
   storage and retrieval means for storing and retrieving first and second sets of color correction values;
   selecting means for selecting portions of the video signals from said first and second sources to form edited video signals; and
   color correction means responsive to a selected one of the first and second sets of color correction values for color correcting the video signals produced by one of said first and second source means, said color correction means being adapted to form color corrected video signals from the video signals produced by said one of said first and second source means;
   wherein said color correction means is connected between the outputs of said first and second source means and the inputs of said selecting means, whereby said color correction means supplies the color corrected video signals to said selecting means, and wherein said storage and retrieval means is connected to said color correction means and delivers said color correction values to said color correction means.

2. A system as recited in claim 1, wherein the first source means produces component video signals and the second source means produces component video signals and wherein the color correction means is adapted to correct the component video signals produced by the first source means and the component video signals produced by the second source means.

3. A system as recited in claim 1, further comprising:
   recording means for recording the edited video signals; and
   control means for controlling any or all of the first source means, the second source means, the storage and retrieval means, the selecting means, and the recording means.

4. A system as recited in claim 1, including a plurality of said color correction means, each being connected to receive the video signals output from one of said first and second source means.

5. A system as recited in claim 1, wherein the first set of color correction values includes hue and/or saturation correction signals.

6. A system as recited in claim 1, wherein the storage and retrieval means stores and retrieves a third set of color correction values, wherein the first set of color correction values is retrieved from the storage and retrieval means and applied to the color correction means to color correct video signals associated with a first portion of the first recording medium, and wherein the third set of color correction values is retrieved from the storage and retrieval means and applied to the color correction means to color correct video signals associated with a second portion of the first recording medium.

7. A system as recited in claim 6, further comprising means for controlling the retrieval from the storage and retrieval means of the first and third sets of color correction values.

8. An editing system comprising:
   first source means for producing video signals from a first recording medium;
   second source means for producing video signals from a second recording medium;
   storage and retrieval means for storing and retrieving first and second sets of color correction values;
   selecting means for selecting portions of the video signals from said first and second sources to form edited video signals; and
   color correction means responsive to a selected one of the first and second sets of color correction values for color correcting the video signals produced by one of said first and second source means, said color correction means being adapted to form color corrected video signals from the video signals produced by said one of said first and second source means;

said editing system including combining means for producing special effects, and including recording means for recording the edited video signals, said color correction means being connected to receive signals from said combining means and deliver color corrected signals to said recording means;

wherein said first and second source means are connected to said selecting means, wherein said selecting means is connected to said combining means, whereby said selecting means supplies uncorrected video signals to said combining means, and wherein said storage and retrieval means is connected to said color correction means and delivers said color correction values to said color correction means.

9. An editing system, comprising:

first source means for producing video signals from a first recording medium;

second source means for producing video signals from a second recording medium;

switching means for switching video signals produced by the first source means and the second source means, said switching means being connected to receive signals from each of said first and second source means;

color correction means for color correcting video signals from the switching means, said color correction means being connected to receive signals from said switching means;

combining means for combining color corrected video signals from the color correction means, said combining means being connected to receive signals from said color correction means; and recording means for recording video signals from the combining means, said recording means being connected to receive signals from said combining means.

10. A system as recited in claim 9, wherein the first source means produces component video signals and the second source means produces component video signals, wherein the switching means switches the component video siganls produced by the first and second source means, and wherein the color correction means color corrects the component video signals produced by the first and second source means.

11. A system as recited in claim 9, further comprising storage and retrieval means for storing and retrieving first and second sets of color correction values, wherein the color correction means is responsive to a selected one of the first and second sets of color correction values.

12. A system as recited in claim 11, further comprising control means for controlling the first source means, the second source means, the switching means, the storage and retrieval means, the combining means, and the recording means.

13. A system as recited in claim 12, wherein the control means is adapted to automatically control the first source means, the second source means, the switching means, the storage and retrieval means, the combining means, and the recording means in response to a predetermined set of instructions.

14. A system as recited in claim 12, wherein the control means includes means for selectively controlling any of the first source means, the second source means, the switching means, the storage and retrieval means, the combining means, and the recording means.

15. A system as recited in claim 12, wherein the first set of color correction values includes hue and/or saturation correction values.

16. A system as recited in claim 11, wherein the storage and retrieval mean stores and retrieves a third set of color correction values, wherein the first set of color correction values is retrieved from the storage and retrieval means and applied to the color correction means to color correct video signals associated with a first portion of the first recording medium, and wherein the third set of color correction values is retrieved from the storage and retrieval means and applied to the color correction means to color correct video signals associated with a second portion of the first recording medium.

17. A system as recited in claim 16, further comprising means for controlling the retrieval from the storage and retrieval means of the first and third sets of color correction values in response to a predetermined set of instructions.

18. An editing system comprising:

first source means for producing video signals from a first recording medium;

second source means for producing video signals from a second recording medium;

switching means for switching video signals produced by the first source means and the second source means;

color correction means for color correcting video signals from the switching means;

combining means for combining color corrected video signals from the color correction means; and recording means for recording video signals from the combining means;

wherein said combining means includes at least one mix effects amplifier with two input leads, said color correction means comprises at least two color correction modules, each connected to one of said input leads and to one of said sources.

19. A method for editing the contents of a first recording medium and a second recording medium, comprising the steps of:

providing first and second sets of color correction values in a memory;

selectively producing first video signals from the first recording medium;

selectively producing second video signals from the second recording medium in a predetermined time relationship with said first video signals;

reading the first set of color correction values from the memory;

color correcting the video signals produced from the first recording medium using the first set of color correction values read from the memory to provide first color corrected video signals;

reading the second set of color correction values from the memory;

color correcting the video signals produced from the second recording medium using the second set of color correction values read from the memory to provide second color corrected video signals;

selectively combining said first color corrected video signals and said second color corrected video signals to form color corrected edited video signals; and recording the color corrected edited video signals.

20. A method as recited in claim 19, wherein each of the producing steps includes producing component video signals and wherein each of the color correcting steps includes color correcting component video signals.

21. A method as recited in claim 19, further comprising the step of automatically controlling the producing steps, the reading steps, the combining step, and the recording step.

22. A method as recited in claim 19, further comprising the step of selectively controlling any of the producing steps, the reading steps, the combining step, and the recording step.

23. A method as recited in claim 19, wherein each of the reading steps includes reading hue and/or saturation correction.

24. A method as recited in claim 19, wherein the providing step includes providing a third set of color correction values in the memory, further comprising the step of reading the third se of color correction values from the memory, and wherein the step of color correcting the video signals from the first recording medium includes color correcting the video signals associated with a first portion of the first recording medium using the first set of color correction values and color correcting the video signals associated with a second portion of the first recording medium using the third set of color correction values.

25. A method for editing the contents of a first recording medium and a second recording medium, comprising the steps of:
providing first and second sets of color correction values in a memory;
reading the first set of color correction values;
reading the second set of color correction values;
producing video signals from the first recording medium;
switching the video signals produced from the first recording medium to provide first switched video signals;
color correcting the first switched video signals to provide first color corrected video signals;
producing video signals from the second recording medium;
switching the video signals produced from the second recording medium to provide second switched video signals;
color correcting the second switched video signals to provide second color corrected video siganls;
combining the first color corrected video signals and the second color corrected video signals to provide edited video signals; and
recording the edited video signals;
wherein the step of color correcting the first switched video signals includes color correcting the first switched video signals using the first set of color correction values and wherein the step of color correcting the second switched video signals includes color correcting the second switched video signals using the second set of color correction values.

26. A method as recited in claim 25, wherein each of the producing steps includes producing component video signals, wherein each of the switching steps includes switching component video signals, and wherein each of the color correcting steps includes color correcting component video signals.

27. A method as recited in claim 25, further comprising the step of automatically controlling the producing steps, the switching steps, the reading steps, the combining step, and the recording step.

28. A method as recited in claim 25, further comprising the step of selectively controlling any of the producing steps, the switching steps, the reading steps, the combining step, and the recording step.

29. A method as recited in claim 25, wherein each of the reading steps includes reading a color balance correction, a hue correction, a saturation correction, and a luminance correction.

30. A method as recited in claim 25, wherein the providing step includes providing a third set of color correction values in the memory, further comprising the step of reading the third set of color correction values from the memory, and wherein the step of color correcting the first switched video signals includes color correcting the video signals associated with a first portion of the first recording medium using the first set of color correction values and color correcting the video signals associated with a second portion of the first recording medium using the third set of color correction values.

31. A system for color correcting video signals from a plurality of separate sources, said system comprising, in combination, computer memory means for storing and retrieving separate color correction signals for signals from each of said sources, and correction means for reading out and utilizing the stored signals for correcting the signals from a selected one of said sources, said system including means for selectively operating said sources in sequence or simultaneously and reading out of said memory the correction signals for each of said sources when the corresponding source is operating.

32. A system as in claim 31 including combining and recording means for selectively combining the signals from said sources and recording the color-corrected combination on a video record medium.

33. A system as in claim 31 in which said sources include a plurality of image record reproducers, and means for storing in said memory different correction signals for each of a plurality of different portions of at least one image record being reproduced, and means for applying the different correction signals to video signals corresponding to the different portions.

34. A system as in claim 31 in which said correction means includes at least two separate units, each connected to receive the output from one of said sources and deliver color-corrected signals to said combining means.

35. A system as in claim 31 including combining means and recording means in which said combining means is connected to deliver signals to said correction means, and said correction means is connected to deliver signals to said recording means.

36. A method of color correcting a video signal from a plurality of video sources, said method comprising the steps of storing in and retrieving from computer memory a plurality of color correction signals, each specific to correcting all or a portion of the signals from one of said sources, applying the correction signals to their respective source signals, and utilizing the resulting corrected signals.

37. A color correcting editing system comprising, in combination, player means for converting into video signals images recorded on elongated image record medium stored in one or more separate increments, one increment at a time, means for storing and retrieving color corrections for selected segments of the sequential images on said record medium in each of said increments, color correcting means connected to color correct the signals from said player means in response to said corrections, a video tape recorder connected to receive and record color-corrected video signals, and an editing computer connected to control the recording of selected segments of each of said increments at a location at which it is to be recorded regardless of the sequence in which it is reproduced, and, if necessary, recording other segments from other increments interspersed with the first-named segments, and for ordering the reading out of storage of the appropriate color corrections for the segment being reproduced.

38. A system as in claim 37 in which said separate increments are stored on separate roll-form storage media.

39. A system as in claim 38 in which said increments comprise separate lengths of video tape, said player means comprises a single video tape player.

40. A system as in claim 37 in which said color corrections include corrections to the hue and/or saturation of a plurality of separate color vector signals.

41. A system as in claim, 37 in which said color corrections include luminance signal corrections formed by combining variable amounts of separate color vector signals.

42. A method of editing and color correction comprising converting into video signals images recorded on elongated image record medium stored in one or more separate increments, one increment at a time, storing and retrieving color corrections for selected segments of the sequential images on said record medium in each of said increments, color correcting said video signals in accordance with the stored color corrections, and recording the color-corrected video signals on video tape by the recording of selected segments of each of said increments at a location at which it is to be recorded regardless of the sequence in which it is reproduced, and, if necessary, recording other segments from other increments interspersed with the first-named segments, and ordering the reading out of storage of the appropriate color corrections for the segment being reproduced.

43. A method as in claim 42 in which a single reproducer is used to reproduce and convert images from video tapes stored in separate roll-form storage media, recording all segments to be used from one such roll, then recording all segments to be used from a second such roll, by reproducing each such roll in said single reproducer in sequence.

44. A method as in claim 42 in which said color corrections include corrections to the hue and/or saturation of a plurality of separate color vector signals.

45. A method as in claim 42 in which said color corrections include luminance signal corrections formed by combining variable amounts of separate color vector signals.

* * * * *

UNITED STATES PATENT AND TRADEMARK OFFICE
CERTIFICATE OF CORRECTION

PATENT NO. : 4,750,050
DATED : June 7, 1988
INVENTOR(S) : Armand Belmares-Sarabia et al It is certified that error appears in the above-identified patent and that said Letters Patent is hereby corrected as shown below:

Column 19, Line 42, change "siganls" to --signals--.

Column 20, Line 1, change "12" to --11--.

Column 20, Line 5, change "mean" to --means--.

Column 21, Line 18, change "se" to --set--.

Column 21, Line 47, change "siganls" to --signals--.

Column 23, Line 23, delete ","

Signed and Sealed this

Tenth Day of January, 1989

*Attest:*

DONALD J. QUIGG

*Attesting Officer*   *Commissioner of Patents and Trademarks*